United States Patent [19]

Obeda

[11] 4,249,986

[45] Feb. 10, 1981

[54] HIGH FREQUENCY HORN WITH SOFT METALLIC COATING

[75] Inventor: Edward G. Obeda, Brookfield, Conn.

[73] Assignee: Branson Ultrasonics Corporation, New Canaan, Conn.

[21] Appl. No.: 120,751

[22] Filed: Feb. 12, 1980

[51] Int. Cl.[3] ............................ B06B 3/00; B23K 1/06

[52] U.S. Cl. .................................. 156/580.1; 74/1 SS; 228/1 R; 228/1 B; 425/174.2

[58] Field of Search ................. 156/73.1, 580.1, 580.2; 228/1 R, 1 B; 74/1 SS; 264/23; 425/174.2

[56] References Cited

U.S. PATENT DOCUMENTS

| | | | |
|---|---|---|---|
| 2,792,674 | 5/1957 | Balamuth et al. | 74/1 SS |
| 3,113,225 | 12/1963 | Kleesattel et al. | 101/364 |
| 3,175,406 | 3/1965 | Eisner | 74/1 SS |
| 3,733,238 | 5/1973 | Long et al. | 156/580.1 |
| 3,817,141 | 6/1974 | Simonetti | 74/1 SS |
| 3,879,256 | 4/1975 | Rust, Jr. | 156/580.1 |

*Primary Examiner*—Michael G. Wityshyn
*Attorney, Agent, or Firm*—Ervin B. Steinberg; Philip J. Feig

[57] ABSTRACT

A horn for operation in the sonic or ultrasonic frequency range and made preferably from aluminum or titanium is provided at its lateral surface with a soft metallic coating which acts as a cushion and/or lubricant when the horn accidentally contacts a juxtaposed horn or mechanical fixture. The soft metallic coating in the described embodiment comprises an alloy of tin and lead which is applied over the nickel plated horn surface.

6 Claims, No Drawings

HIGH FREQUENCY HORN WITH SOFT METALLIC COATING

BRIEF SUMMARY OF THE INVENTION

This invention refers to horns, also called resonators, tools, mechanical impedance transformers, sonotrodes and the like, as used for transmitting vibratory energy in the sonic or ultrasonic frequency range to a workpiece. The high frequency energy, for instance, serves for welding thermoplastic workpieces. Horns of this type most frequently operate in the frequency range from 10 to 100 KHz. They are for the most part elongated metal bodies of round, rectangular or combined round-rectangular construction dimensioned to be resonant as a half wavelength resonator at a predetermined frequency of sound travelling longitudinally therethrough from an input end at which the vibratory high frequency is applied to the opposite output end at which the vibratory energy, usually of amplified magnitude, is transferred to a workpiece.

The design of such horns is described in "Ultrasonic Engineering" (book) by Julian R. Frederick, John Wiley & Sons, New York, N.Y. (1965) pages 87 to 103 or in U.S. Pat. No. 2,792,674 L. Balamuth et al issued May 21, 1957; No. 3,113,225 C. Kleesattel et al issued Dec. 3, 1963; No. 3,175,406 E. Eisner issued Mar. 30, 1965 and others.

Welding applications are known wherein a plurality of horns are disposed in close lateral relation in order to provide welding at juxtaposed or abutting locations of a workpiece, particularly when welding soft thermoplastic sheet material. An application of this type is shown, for instance, in U.S. Pat. No. 3,733,238 issued to D. D. Long et al on May 15, 1973. This patent describes the use of ultrasonic energy for fabricating quilted material, such as mattress pads or bed covers, by providing a pattern of closely spaced spot welds. In order to provide welds in close proximity to one another, in a manner similar to electrical spot welding, it is necessary that the horns be spaced close to one another. Horns are mounted in a resilient manner in order to provide vibratory energy to the underlying workpiece and are urged in steady contact with the workpiece while undergoing a vibratory excursion at the output end from 0.0005 to 0.005 inch peak-to-peak. The resilient mounting together with inherent play in the mounting structure may cause the undesired condition where juxtaposed horns may momentarily strike each other at a lateral surface. Such striking most commonly occurs at the output end of the horn where the high frequency excursion is nearly at or at its maximum amplitude. Such striking produces local burn marks at the highly polished horn surface or causes pitting in the high stress portion of the horn. When this happens, a mechanical stress riser is produced and soon thereafter the horn, made most commonly of titanium or specially treated high-stress aluminum, exhibits cracks at such stress points, rendering the horn unusuable as a result of cracking or failure to continue operation at its resonant condition. Similarly, the horn may also come in contact with stationary fixturing when small clearances are encountered between the horn and the fixture.

Replacement of horns is not only expensive, but being tailor-made tools for a particular application, the reprocurement and awaiting delivery of specially designed horns is time-consuming and expensive in production processes.

An object of the present invention is to overcome the hereinabove stated problem by providing the lateral surface of the horn with a metallic lubricant. While soft non-metallic coatings such as Teflon, Mylar or rubber have been suggested, these materials fail to stand up under the high mechanical stress to which resonant horns are subjected. These polymeric coating materials fail to stand up, become subject to deterioration by heat, not to mention the difficulty of adhering such materials to the metallic horn. However, it has been found that a soft metallic coating is readily adhered to the horn and surprisingly serves as a cushioning and lubricating agent.

DETAILED DESCRIPTION OF THE INVENTION

As indicated above, horns are elongated metallic structures, most commonly made of special alloy steel, specially treated aluminum or titanium. They have an input end for receiving vibratory energy from a source of high frequency vibratory energy, such as a magnetostrictive or piezoelectric converter unit. The opposite end of the horn, known as the output end, provides vibratory energy at the same frequency, but usually of increased amplitude to a workpiece. In a welding application, the vibratory energy of the horn output surface is urged into pressure contact with the workpiece for causing localized heating in the workpiece and, if the workpiece is of thermoplastic material, localized softening and flowing of the thermoplastic material is obtained. Upon the cessation of the vibratory energy, the softened material solidifies, causing a weld. As is well understood from the prior art, the horns can take various geometric forms and for amplification may have stepped cross-sectional areas. Horns are known as cylindrical horns (round cross-section of the output end), bar horns (rectangular or square cross-section) and various other combinations.

In accordance with this invention, the lateral surface of the horn when such a horn is mounted in close proximity to an adjacent horn or mechanical fixturing and the possibility of mechanical striking exists, even if such striking is only momentarily, is provided with a coating of soft metal alloy. A usuable soft coating is the conventional 60/40 lead-tin alloy (solder). In order to apply such alloy, the horn made from aluminum or titanium base material is first nickel plated in the usual manner. Next, the soft metallic coating which serves as a lubricant is applied to the horn side surface by flame heating or exposing the horn surface to a bath of the lubricant material.

It has been found that the soft metallic material described above adheres well to the nickel plated surface and serves as an excellent cushioning and lubricating agent when the horn, while resonant, momentarily strikes an abutting horn or mechanical fixturing. Typical coating thickness of the solder material is 0.010 inch. The soft metallic material, of course, has a higher heat conductivity than non-metallic compounds and is not subject to the deterioration experienced with non-metallic coatings. By virtue of the soft metal coating, the damage experienced previously is avoided.

While there has been described a preferred embodiment of the invention, it will be apparent to those skilled in the art that changes and modifications may be made therein without deviating from the principle of the invention which shall be limited only by the scope of the appended claims.

What is claimed is:

1. A horn adapted to the resonent along its longitudinal axis when excited with high frequency vibratory energy at an input end and adapted to provide high frequency vibrations to a workpiece at an opposite output end comprising:

an elongated metallic body dimensioned to be resonent as a half wavelength resonator at the frequency of sound travelling longitudinally therethrough;

a soft metallic coating applied to the lateral surface of said body at least in the area where said body may come in contact with an adjacently disposed similar horn or mechanical fixture.

2. A horn as set forth in claim 1, said soft metallic coating being an alloy comprising lead and tin.

3. A horn as set forth in claim 1, said coating being soft solder.

4. A horn as set forth in claim 1, said metallic body being aluminum which is nickel plated, and said soft metallic coating comprising an alloy containing lead and tin covering such nickel plating.

5. A horn as set forth in claim 1, said metallic body being titanium which is nickel plated, and said soft metallic coating comprising an alloy containing lead and tin covering such nickel plating.

6. A horn as set forth in claim 1, said coating being present at a lateral surface near said output end.

* * * * *